US006573968B2

(12) United States Patent
Jeong

(10) Patent No.: US 6,573,968 B2
(45) Date of Patent: Jun. 3, 2003

(54) SEAL PATTERN FOR LIQUID CRYSTAL DISPLAY DEVICE AND RELATED METHOD

(75) Inventor: Jae-Gyu Jeong, Taegu (KR)

(73) Assignee: LG. Philips LCD Co., Ltd., Seoul (KR)

( * ) Notice: Subject to any disclaimer, the term of this patent is extended or adjusted under 35 U.S.C. 154(b) by 347 days.

(21) Appl. No.: 09/737,766

(22) Filed: Dec. 18, 2000

(65) Prior Publication Data

US 2001/0012088 A1 Aug. 9, 2001

(30) Foreign Application Priority Data

Dec. 16, 1999 (KR) .......................................... 1999-58106

(51) Int. Cl.$^7$ ............................................. G02F 1/1336
(52) U.S. Cl. ........................................................ 349/153
(58) Field of Search ..................................... 349/153, 154, 349/187, 189, 190

(56) References Cited

U.S. PATENT DOCUMENTS

| 5,335,103 | A | * | 8/1994 | Kim ............................ 349/154 |
| 5,410,423 | A | * | 4/1995 | Furushima et al. ......... 349/190 |
| 6,137,559 | A | * | 10/2000 | Tanaka et al. .............. 349/153 |

* cited by examiner

*Primary Examiner*—James Dudek
(74) *Attorney, Agent, or Firm*—McKenna Long & Aldridge LLP

(57) ABSTRACT

A seal pattern includes a plurality of main seal lines, a first auxiliary seal line including a plurality of first openings and surrounding the plurality of main seal lines, a second auxiliary seal including a plurality of second openings and surrounding the first auxiliary seal line, and a plurality of third auxiliary seal lines positioned between the first and second openings. The third auxiliary seal lines pass only gas such as air and the main seal lines are protected from being damaged from a cleaning detergent or an etchant such as an HF solution during a cleaning and etching process.

54 Claims, 5 Drawing Sheets

SEAL PATTERN FOR LIQUID CRYSTAL DISPLAY DEVICE AND RELATED METHOD

This application claims the benefit of Korean Patent Application No. 1999-58106, filed on Dec. 16, 1999, which is hereby incorporated by reference.

BACKGROUND OF THE INVENTION

1. Field of the Invention

The present invention relates to a liquid crystal display (LCD) device, and more particularly, to a seal pattern for a liquid crystal display and a method of manufacturing the same.

2. Discussion of the Related Art

Recently, liquid crystal display (LCD) devices with light, thin, low power consumption characteristics have been used, for example, in office automation (OA) equipments and video units. A typical liquid crystal display (LCD) panel has upper and lower substrates and an interposed liquid crystal layer. The upper substrate usually includes common electrodes, while the lower substrate includes switching elements, such as thin film transistors (TFTs), and pixel electrodes.

As the present invention relates to manufacturing liquid crystal display panels, a brief explanation of conventional liquid crystal display manufacturing processes will be discussed. Common electrodes and pixel electrodes are formed on upper and lower substrates, respectively. A seal is then formed on the lower substrate. The upper and lower substrates are then bonded together using the seal such that the common electrodes of the upper substrate and the pixel electrodes of the lower substrate face each other, forming liquid crystal cells. Liquid crystal material is then injected into those cells through injection holes. The injection holes are then sealed. Finally, polarizing films are attached to the outer surfaces of the upper and lower substrates.

The pixel and common electrodes generate electric fields that control the light passing through the liquid crystal cells. By controlling the electric fields desired characters or images are displayed.

While fabricating the various components of a liquid crystal display, such as the thin film transistors or the color filters, typically requires numerous manufacturing steps, the overall fabrication process is relatively straightforward. FIG. 1 illustrates a typical liquid crystal panel manufacturing process in some detail. Step st1 forms an array matrix of thin film transistors and pixel electrodes over an array (lower) substrate.

Step st2 forms an orientation film over the lower substrate. This involves uniformly depositing a polymer thin film over the lower substrate and then uniformly rubbing the polymer thin film with a fabric. The rubbing process involves rubbing the surface of the polymer thin film to orientate or align the film. A typical orientation film is an organic thin film such as a polyimide thin film.

Step st3 produces a seal pattern on the lower substrate. When the upper and lower substrates are attached, the seal pattern forms cell spaces that will receive the liquid crystal material. The seal pattern will also prevent the interposed liquid crystal material from leaking out of the completed liquid crystal cell. A thermosetting plastic and a screen-print technology are conventionally used to fabricate the seal pattern.

Step st4 is to spray spacers over the lower substrate. The spacers have a definite size and act to maintain a precise and uniform space between the upper and lower substrates. Accordingly, the spacers are placed with a uniform density on the lower substrate using either a wet spray method, in which case the spacers are mixed in an alcohol and then sprayed, or a dry spray method in which only the spacers are sprayed. The dry spray method is divided into a static electric spray method that uses static electricity and a non-electric spray method that uses gas pressure. Since static electricity can be harmful to the liquid crystal, the non-electric spray method is widely used.

The next step, st5, is to aligned and attached the upper and lower substrates together, and to attach color filters to the upper substrate and the lower substrate. The aligning margin, which is less than a few micrometers, is important. If the upper and lower substrates are aligned and attached beyond the aligning margin, light leaks away such that the liquid crystal cell cannot adequately performed its function.

Step st6 cuts the liquid crystal element fabricated through the above five steps into individual liquid crystal cells. Conventionally, a liquid crystal material was injected into the space between the upper and the lower substrates before cutting the liquid crystal element into individual liquid crystal cells. However, as displays have become larger, the liquid crystal cells are usually cut first and then the liquid crystal material is injected. The cutting process typically includes scribing using a diamond pen to form cutting lines on a substrate, and a breaking step that separates the substrate along the scribed lines.

Step st7 actually injects liquid crystal material into the individual liquid crystal cells. Since each individual liquid crystal cell is a few square centimeters in area, but has only a few micrometer gap between plates, a vacuum injection method is effectively and widely used. Generally, the step of injecting the liquid crystal material into the cells takes the longest manufacturing time. Thus, for manufacturing efficiency, it is important to have optimum conditions for vacuum injection.

Now, referring to FIG. 2, the screen-print method used for the seal pattern process of the third step (st3) is explained.

The screen-print technology is facilitated with a patterned screen 6 and a squeegee 8. In order to interpose the liquid crystal without leakage, the seal pattern 2 is formed along edges of a substrate 1. At one side of the edge, an injection hole 4 for injecting the liquid crystal is formed. To form the seal pattern 2, a thermosetting resin or an ultraviolet-setting epoxy resin and the like is deposited on the substrate 1, and thereafter a solvent included in the sealant is evaporated for leveling.

At this point, although the epoxy resin itself is not harmful to the liquid crystal, an amine in a thermohardening solvent for forming the thermosetting resin decomposes the liquid crystal. Thus, when using the epoxy resin for the seal pattern 2, the sealant formed through the screen-print technology should be pre-baked sufficiently with a gradual variance of the baking temperature. Further, in forming the seal pattern, the uniformity in thickness and width of the sealant are very important to maintain the uniform spacing (or gap) between the two substrates.

FIG. 3 shows a different seal-patterning technology, a dispenser-print technology. As shown, the dispenser-print technology uses a dispenser 30 filled with the sealant and a table 100 where the substrate 1 is placed. The dispenser 30 moves over the table 100 and forms the sealant according to the direction of the arrow so as to form the sealant pattern 2.

FIG. 4 shows a conventional seal pattern formed on a substrate via the above-mentioned seal-patterning technology. Referring to FIG. 4, on a substrate 1, a seal pattern 2 is formed. The seal pattern 2 includes main seal lines 2a and an auxiliary seal line 2b. As previously explained, the main seal lines 2a prevent the leakage of the liquid crystal, while the auxiliary seal line 2b surrounds the main seal lines 2a to protect the main seal lines 2a from a cleaning detergent or an etching solution during a cleaning and etching process.

The cleaning and etching process decreases the thickness of the assembled substrates. A 10% decrease in the substrate thickness result in a 20% decrease in the weight of the liquid crystal display device. FIG. 5 illustrates the cleaning and etching process in a block diagram.

Before the seventh step, st7, of injecting the liquid crystal shown in FIG. 1, the assembled substrates produced from the first to sixth steps, st 1 to st 6, shown in FIG. 1, are cleaned manually using a cleaning detergent such as isopropyl alcohol (IPA) or deionized water (DI water). Through the first cleaning step, ST 100, contaminants such as a polymer layer or minute particles on the outer surfaces of the assembled substrates are removed.

Next, in an etching step, ST 200, using an etching apparatus, the assembled substrates are etched in aqueous solution of hydrofluoric (HF) acid.

In a next cleaning step, ST 300, the HF solution remaining on the assembled substrates is removed, and in a drying step, ST 400, the assembled substrates are dried sufficiently.

Subsequently, in the seventh step, st7, of FIG. 1, the liquid crystal is injected into the assembled substrates and sealed. The etching apparatus may also be used for cleaning step ST300 and the drying step ST 400.

As above-mentioned, during the cleaning and etching steps, ST100 and ST200, the auxiliary seal line 2b protects the main seal lines 2a from the cleaning detergent or the HF solution such that the main seal lines 2a maintain their structure. However, the auxiliary seal line 2b is damaged as illustrated in FIG. 6.

Referring to FIG. 6, when an upper substrate 20 is attached to the lower substrate 1, air 10 existing between the main seal lines 2a and auxiliary seal line 2b is pressurized and still remains therebetween. After the attachment, since there is no open hole in the auxiliary seal line 2b, the pressurized air 10 can not be discharged from the assembled substrates 1 and 20. The pressurized air 10 in the assembled substrates makes air bubbles 16 or cracks 18 in the main and auxiliary seal lines 2a and 2b. Due to the air bubbles 16 and cracks 18, the main seal lines 2a can not stably seal the liquid crystal injected in a later process.

As shown in FIG. 7, if open holes "A" are formed in auxiliary seal lines 2c to solve the above-mentioned problem, the cleaning detergent or HF solution penetrates into the assembled substrates in the cleaning and etching process, results in a deformation of the main seal lines 2a.

SUMMARY OF THE INVENTION

Accordingly, the present invention is directed to a seal pattern of a liquid crystal display device that substantially obviates one or more of the problems due to limitations and disadvantages of the related art.

An advantage of the present invention is a seal pattern for a liquid crystal display device that prevents damage from a cleaning detergent or an etchant such as an HF solution.

Another advantage of the present invention is a seal pattern for a liquid crystal display device that allows air to flow freely.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a liquid crystal display device includes a plurality of main seal lines on a substrate; a first auxiliary seal line having a plurality of first open holes (or openings); a second auxiliary seal line having a plurality of second open holes; and third auxiliary seal lines between the first and second open holes, each of the third auxiliary seal line having first and second portions. The first auxiliary seal line surrounds the main seal lines. The second auxiliary seal line surrounds the first auxiliary seal line. The first and second portions of each of the third auxiliary seal lines are connected with the first and second auxiliary seal lines, respectively. Each of the third auxiliary seal lines has a zigzag shape. Each width of the first and second open holes is at least four times as large as each thickness of the first and second auxiliary seal lines.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to an embodiment of the present invention, which is illustrated in the accompanying drawings.

Figure 8:
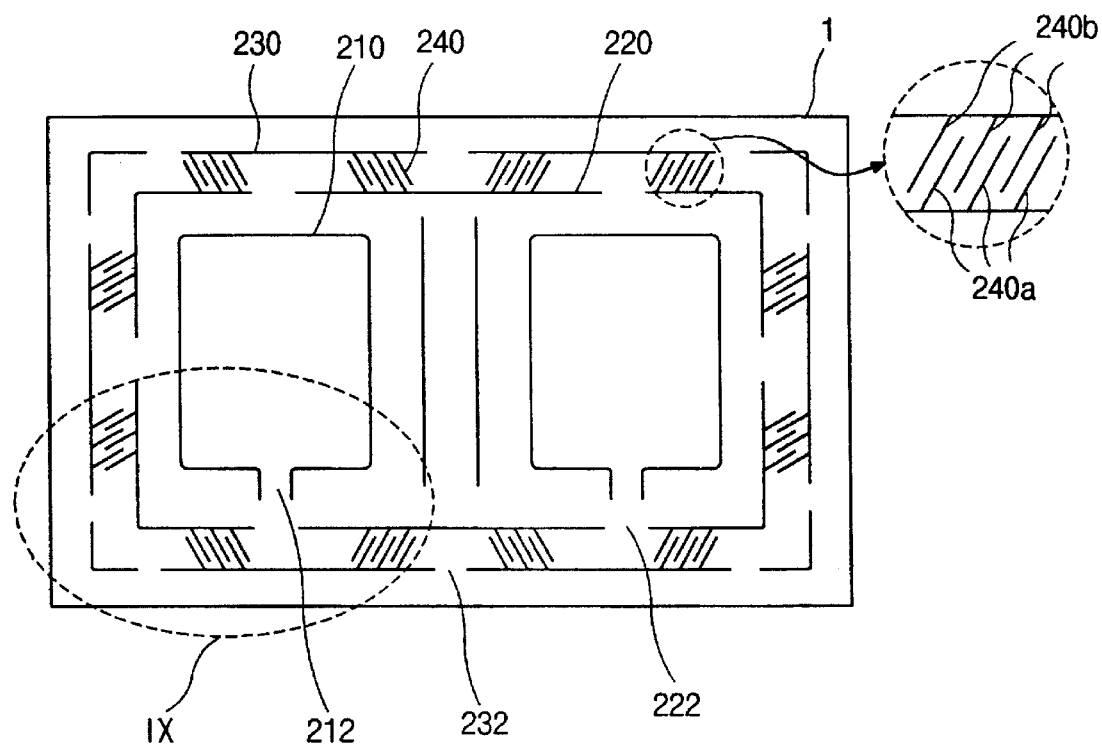
FIG. 8 is a plane view of a seal pattern according to a preferred embodiment of the present invention.

Referring to FIG. 8, on a substrate 1, a plurality of main seal lines 210 are formed in a rectangular shape. At one side in each of the main seal lines 210, an injection hole 212 is formed to open the main seal line 210. Through the injection hole 212, a liquid crystal will be injected (in the liquid crystal injection step, st7, shown in FIG. 1) into a space defined by the main seal lines 210.

A first auxiliary seal line 220 is formed on the substrate 1 and surrounds the plurality of main seal lines 210 with space between the main and the auxiliary seal lines 210 and 220. In the first auxiliary seal line 220, a plurality of first open holes (or openings) 222 are formed to open the first auxiliary seal line 220. The first open holes 222 should not overlap the injection holes 212 of the main seal lines 210 in its location.

A second auxiliary seal line 230 is formed on the substrate 1 and surrounds the first auxiliary seal line 220 with space between the first and the second auxiliary seal lines 220 and 230. In the second auxiliary seal line 230, a plurality of second open holes 232 are formed to open the second auxiliary seal line 230. At this point, the second open holes 232 should not overlap the first open holes 222 of the first auxiliary seal line 220. Namely, the second open holes 232 are preferably not located at corresponding portions of the first open holes 222 in the first auxiliary seal line 220.

Between the first and second auxiliary seal lines 220 and 230, a plurality of third auxiliary lines 240 are formed to define boundary areas between the first and the second open holes 222 and 232. Each of the third auxiliary seal lines 240 includes a plurality of first and second seal fins 240a and 240b that are spaced apart from each other alternatively. The first and second seal fins 240a and 240b are preferably connected to the first and second auxiliary seal lines 220 and 230, respectively.

Figure 9:
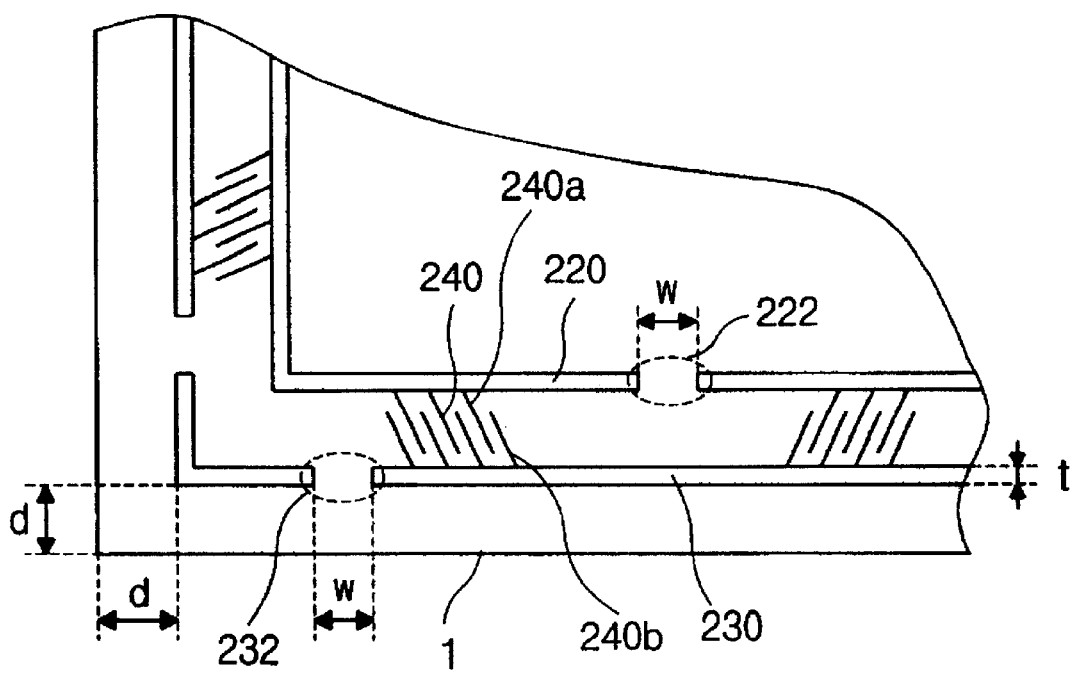
FIG. 9 is an enlarged plane view of a portion "IX" of FIG. 8.

FIG. 9 shows the structure of the first, second, and third auxiliary seal lines 220, 230 and 240 in detail.

Referring to FIG. 9, the second auxiliary seal line 230 is spaced apart from edges of the substrate 1 by a distance "d". The distance "d" is preferably less than 10 mm such that the area of the substrate 1 is efficiently used. Each width "w" of the first and second open holes 222 and 232 is preferably about four times as large as each thickness "t" of the first and second auxiliary seal lines 220 and 230.

Figure 1:
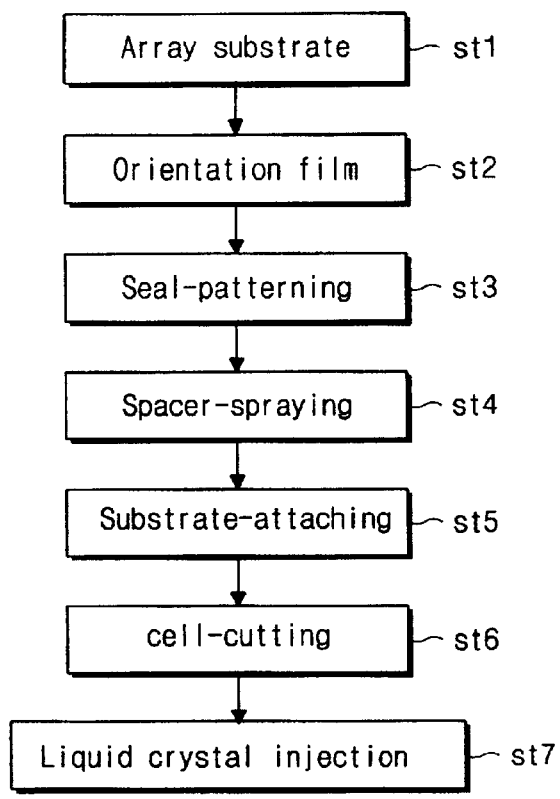
FIG. 1 is a block diagram illustrating a typical manufacturing process for a liquid crystal cell.
Figure 2:
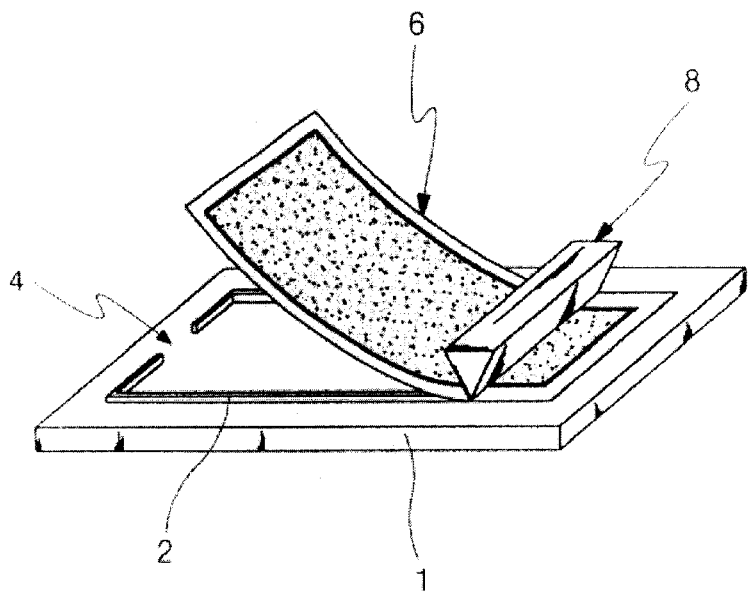
FIG. 2 is a perspective view illustrating a seal pattern process with a screen-print method.
Figure 3:
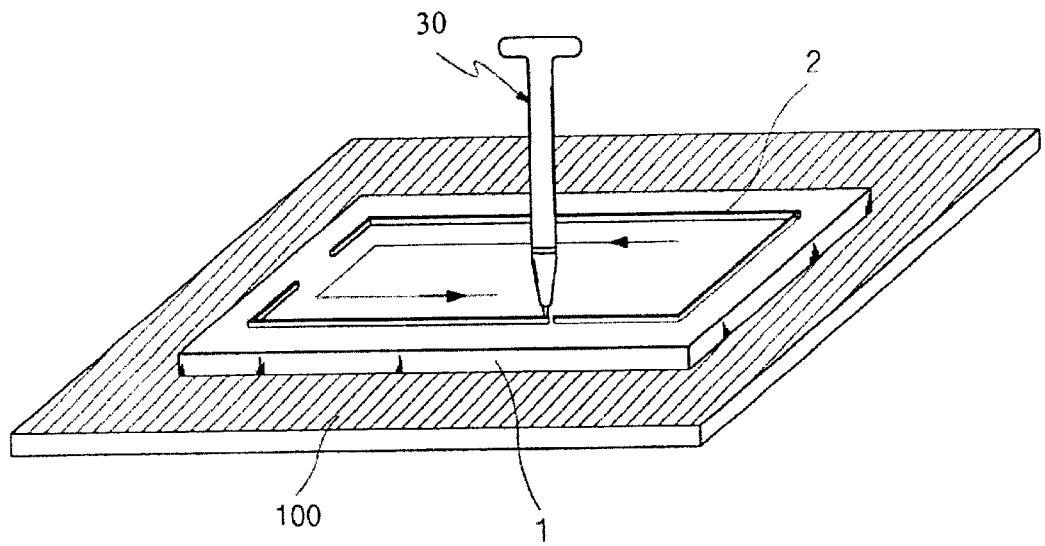
FIG. 3 is a perspective view illustrating a dispenser-print method for the seal pattern.
Figure 4:
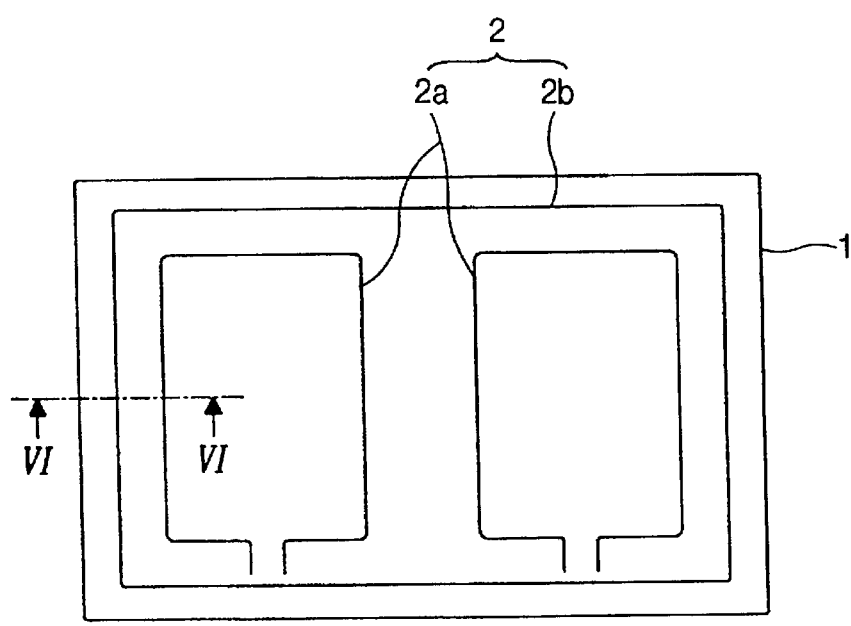
FIG. 4 is a plane view of a conventional seal pattern printed on a substrate.

During the substrate-attaching step, st5, shown in FIG. 1, the open holes shrink such that the width "w" of the open holes become as small as or a little larger than the thickness "t" of the seal lines due to a deformation of the seal lines from pressure. If the open holes are not wide enough, the seal lines become closed after the above-mentioned substrate-attaching step, st5.

Still referring to FIG. 9, the third auxiliary seal lines 240 separate the first open holes 222 from the second open holes 232. In particular, in the space between the first and second auxiliary seal lines 220 and 230, and between the first and second open holes 222 and 232, there preferably always exists a third seal line 240 across the first and second seal lines 220 and 230.

Figure 5:
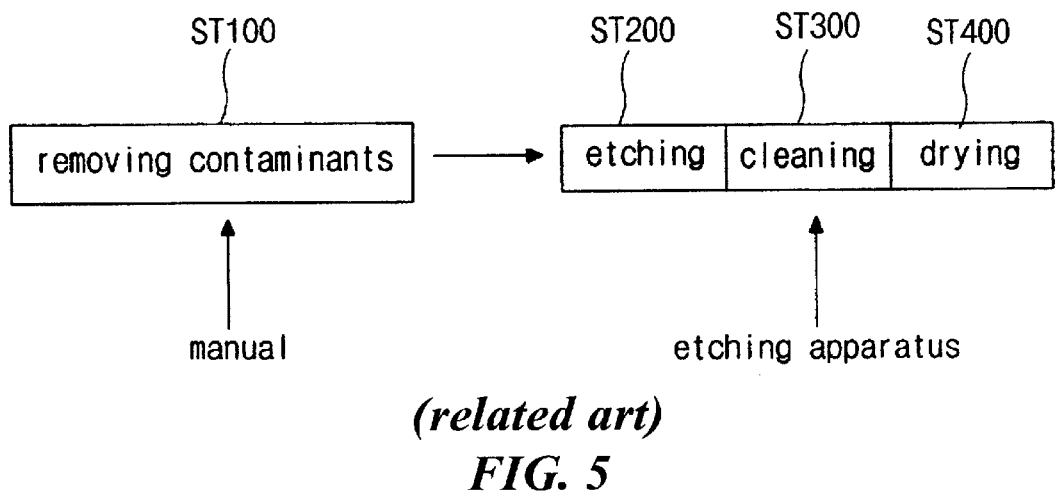
FIG. 5 is a block diagram illustrating a typical etching process for a liquid crystal panel.
Figure 6:
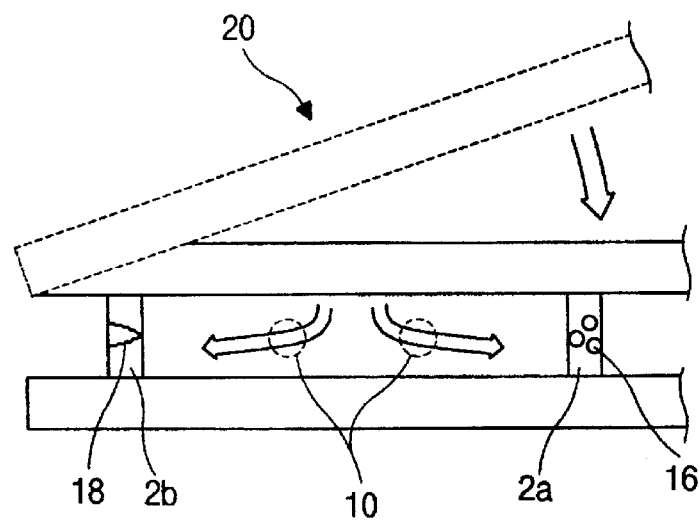
FIG. 6 is a cross-sectional view of the liquid crystal display device panel taken along a line "VI—VI" shown in FIG. 4.
Figure 7:
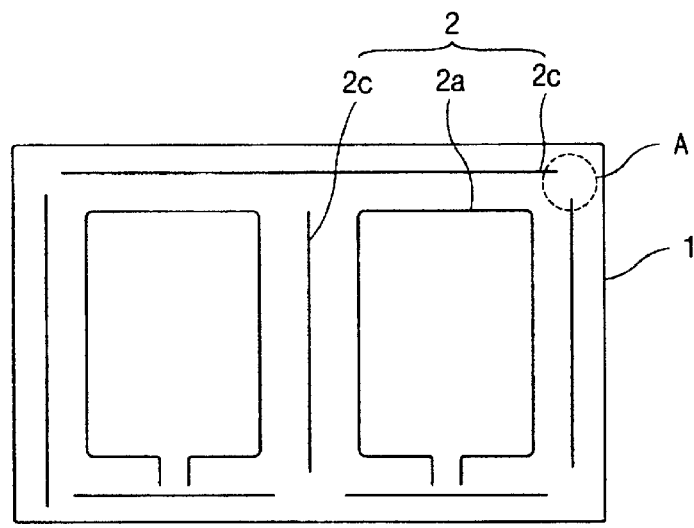
FIG. 7 is a plane view of another conventional seal pattern printed on a substrate.

Since first and second seal fins 240a and 240b are connected to the first and the second auxiliary seal lines 220 and 230, respectively, liquid cannot pass through the third auxiliary seal line 240 due to a surface tension of the liquid. Accordingly, in a later cleaning and etching step illustrated in FIG. 5, a cleaning detergent or an etchant such as an HF solution cannot pass through the third auxiliary seal lines 240, and cannot penetrate through the first auxiliary seal line 220. Therefore, the main seal lines 210 maintain their structure and properties in a safe manner without being damaged from the cleaning detergent or the etching solution.

Since the substrates include silicon oxide ($SiO_2$) by 60%, there occurs a chemical reaction between the substrates and the HF solution as follows:

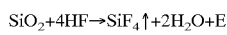

During the etching step, ST200 (FIG. 5), silicon oxide of the substrates is etched via the HF solution. Here, "E" is the heat of reaction that is produced during the etching step.

By measuring the heat "E" of the reaction (a reaction temperature), the etching rate is calculated. The etching step is facilitated from considering the reaction temperature. When the reaction temperature becomes equal to a reference temperature, the etching is stopped. At this point, the desired reduction in the thickness of the substrates is achieved. A more detailed explanation of the substrate etching process is contained in U.S. patent application Ser. No. 09/002,037 filed on Dec. 31, 1997, entitled "Method of Fabricating Substrate" and assigned to the same assignee as the present invention, the entirety of which is hereby incorporated by reference in this application.

However, since the first and second seal fins 240a and 240b are spaced apart from each other in an alternating manner, gas can pass through the third auxiliary seal lines 240 freely. Therefore, in the substrate-attaching step, st 5, shown in FIG. 1, air remaining in the space between the main seal line 210 and the first auxiliary seal lines 220 flows out through the first and second open holes 222 and 232. Since the remaining air between the main seal lines 210 and the first auxiliary seal line 220 is not pressurized, the main seal lines 210 maintain their structure without air bubbles 16 or cracks 18 and safe from being damaged.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:
   a main seal line having a main opening on a substrate;
   a first auxiliary seal line having a first opening;
   a second auxiliary seal line having a second opening; and
   a third auxiliary seal line having first and second portions between the first and second openings.

2. The liquid crystal display device of claim 1, wherein the first auxiliary seal line substantially surrounds the main seal lines.

3. The liquid crystal display device of claim 1, wherein the second auxiliary seal line substantially surrounds the first auxiliary seal line.

4. The liquid crystal display device of claim 1, wherein the third auxiliary seal line has a structure that effectively prevents liquid from penetrating through thee third auxiliary seal line due to surface tension of the liquid.

5. The liquid crystal display device of claim 1, wherein the first and second portions of the third auxiliary seal line are connected to the first and second auxiliary seal lines, respectively.

6. The liquid crystal display device of claim 5, wherein the first portion extends from the first auxiliary seal line in a direction toward the second auxiliary seal line, the first portion not touching the second auxiliary seal line.

7. The liquid crystal display device of claim 6, wherein the first portion extends toward the second auxiliary line in a slanting manner.

8. The liquid crystal display device of claim 5, wherein the second portion extends from the second auxiliary seal line in a direction toward the first auxiliary seal line, the second portion not touching the first auxiliary seal line.

9. The liquid crystal display device of claim 8, wherein the second portion extends toward the first auxiliary line in a slanting manner.

10. The liquid crystal display device of claim 5, wherein the first portion and second portions extend toward the second and first auxiliary lines in a slanting manner, respectively.

11. The liquid crystal display device of claim 1, wherein the second auxiliary seal line is spaced from an edge of the substrate to allow for an efficient use of the substrate.

12. The liquid crystal display device of claim 1, wherein the second auxiliary seal line is spaced from an edge of the substrate by less than 10 mm.

13. The liquid crystal display device of claim 1, wherein the first opening of the first auxiliary seal line and the second opening of the second auxiliary seal line do not overlap each other at all.

14. The liquid crystal display device of claim 1, wherein the first and second portions of the third auxiliary seal line have a zigzag shape.

15. The liquid crystal display device of claim 1, wherein a width of the first opening in the first auxiliary seal line is large enough to be prevented from closing after attaching the substrate to a second substrate.

16. The liquid crystal display device of claim 15, wherein the first opening is about four times as large as a thickness of the first auxiliary seal line.

17. The liquid crystal display device of claim 1, wherein a width of the second opening in the second auxiliary seal line is large enough to be prevented from closing after attaching the substrate to a second substrate.

18. The liquid crystal display device of claim 17, wherein the second opening is about four times as large as a thickness of the second auxiliary seal line.

19. The liquid crystal display device of claim 1, wherein widths of the first and second openings in the first and second auxiliary seal lines are large enough to be prevented from closing after attaching the substrate to a second substrate.

20. The liquid crystal display device of claim 19, wherein the first and second openings are at least four times as large as a thickness of the first and second auxiliary seal lines, respectively.

21. The liquid crystal display device of claim 1, wherein the first auxiliary seal line includes a plurality of first openings.

22. The liquid crystal display device of claim 1, wherein the second auxiliary seal line includes a plurality of second openings.

23. The liquid crystal display device of claim 1, wherein the first opening of the first auxiliary seal line at least partially overlaps the main opening of the main seal line.

24. The liquid crystal display device of claim 1, wherein the first auxiliary seal line includes a plurality of first openings and the second auxiliary seal line includes a plurality of second openings corresponding to the first openings, any pair of the first and second openings having the third auxiliary seal line.

25. The liquid crystal display device of claim 24, wherein at least one of the first openings of the first auxiliary seal line at least partially overlaps the main opening of the main seal line.

26. The liquid crystal display device of claim 1, further comprising a plurality of main seal lines, each main seal line including a main opening.

27. A method of fabricating a liquid crystal display device having first and second substrates comprising:
    forming a main seal line on the first substrate;
    forming a first auxiliary seal line on the first substrate, the first auxiliary seal line having a first opening;
    forming a second auxiliary seal line on the first substrate, the second auxiliary seal line having a second opening;
    forming a third auxiliary seal line having first and second portions on the first substrate;
    attaching the first and second substrates; and
    interposing a liquid crystal layer between the first and second substrates.

28. The method of claim 27, further comprising etching a surface of at least one of the first and second substrates prior to interposing the liquid crystal between the first and second substrates.

29. The method of claim 27, further comprising etching a surface of at least one of the first and second substrates after interposing the liquid crystal between the first and second substrates.

30. The method of claim 27, wherein the first auxiliary seal line substantially surrounds the main seal lines.

31. The method of claim 27, wherein the second auxiliary seal line substantially surrounds the first auxiliary seal line.

32. The method of claim 27, wherein the third auxiliary seal line has a structure that effectively prevents liquid from penetrating through thee third auxiliary seal line due to surface tension of the liquid.

33. The method of claim 27, wherein the first and second portions of the third auxiliary seal line are connected to the first and second auxiliary seal lines, respectively.

34. The method of claim 33, wherein the first portion extends from the first auxiliary seal line in a direction toward the second auxiliary seal line, the first portion not touching the second auxiliary seal line.

35. The method of claim 34, wherein the first portion extends toward the second auxiliary line in a slanting manner.

36. The method of claim 33, wherein the second portion extends from the second auxiliary seal line in a direction toward the first auxiliary seal line, the second portion not touching the first auxiliary seal line.

37. The method of claim 36, wherein the second portion extends toward the first auxiliary line in a slanting manner.

38. The method of claim 33, wherein the first portion and second portions extend toward the second and first auxiliary lines in a slanting manner, respectively.

39. The method of claim 27, wherein the second auxiliary seal line is spaced from an edge of the substrate to allow for an efficient use of the substrate.

40. The method of claim 27, wherein the second auxiliary seal line is spaced from an edge of the substrate by less than 10 mm.

41. The method of claim 27, wherein the first opening of the first auxiliary seal line and the second opening of the second auxiliary seal line do not overlap each other at all.

42. The method of claim 27, wherein the first and second portions of the third auxiliary seal line have a zigzag shape.

43. The method of claim 27, wherein a width of the first opening in the first auxiliary seal line is large enough to be prevented from closing after attaching the substrate to a second substrate.

44. The method of claim 43, wherein the first opening is about four times as large as a thickness of the first auxiliary seal line.

45. The method of claim 27, wherein a width of the second opening in the second auxiliary seal line is large enough to be prevented from closing after attaching the substrate to a second substrate.

46. The method of claim 45, wherein the second opening is about four times as large as a thickness of the second auxiliary seal line.

47. The method of claim 25, wherein widths of the first and second openings in the first and second auxiliary seal lines are large enough to be prevented from closing after attaching the substrate to a second substrate.

48. The method of claim 47, wherein the first and second openings are at least four times as large as a thickness of the first and second auxiliary seal lines, respectively.

49. The method of claim 27, wherein the first auxiliary seal line includes a plurality of first openings.

50. The method of claim 27, wherein the second auxiliary seal line includes a plurality of second openings.

51. The method of claim 27, wherein the first opening of the first auxiliary seal line at least partially overlaps the main opening of the main seal line.

52. The method of claim 27, wherein the first auxiliary seal line includes a plurality of first openings and the second auxiliary seal line includes a plurality of second openings corresponding to the first openings, any pair of the first and second openings having the third auxiliary seal line.

53. The method of claim 52, wherein at least one of the first openings of the first auxiliary seal line at least partially overlaps the main opening of the main seal line.

54. The method of claim 27, further comprising a plurality of main seal lines, each main seal line including a main opening.

* * * * *